US007474233B2

(12) United States Patent
Ponert

(10) Patent No.: US 7,474,233 B2
(45) Date of Patent: Jan. 6, 2009

(54) PARKING CONTROL DEVICE

(75) Inventor: Gregor Ponert, Salzburg (AT)

(73) Assignee: Skidata AG, Gartenau (AT)

( * ) Notice: Subject to any disclaimer, the term of this patent is extended or adjusted under 35 U.S.C. 154(b) by 117 days.

(21) Appl. No.: 10/556,955

(22) PCT Filed: May 10, 2004

(86) PCT No.: PCT/EP2004/004996

§ 371 (c)(1),
(2), (4) Date: Jun. 30, 2006

(87) PCT Pub. No.: WO2004/100075

PCT Pub. Date: Nov. 18, 2004

(65) Prior Publication Data

US 2007/0132611 A1 Jun. 14, 2007

(30) Foreign Application Priority Data

May 12, 2003 (DE) ................................ 103 21 201

(51) Int. Cl.

*G08G 1/01* (2006.01)
*G07B 15/02* (2006.01)
*G07B 15/00* (2006.01)
*G01V 3/16* (2006.01)
*B60Q 1/48* (2006.01)

(52) U.S. Cl. .......................... 340/941; 705/13; 324/301

(58) Field of Classification Search ......... 340/933–943, 340/425.5, 426.1, 541, 932.2, 686.1; 705/13; 324/220, 260, 261, 219, 301

See application file for complete search history.

(56) References Cited

U.S. PATENT DOCUMENTS 3,368,305 A 2/1968 Piekarski
3,825,889 A 7/1974 Koerner
3,863,206 A 1/1975 Rabie
4,302,746 A 11/1981 Scarzello et al.
5,880,682 A 3/1999 Soulliard et al.
5,917,407 A * 6/1999 Squire et al. ................ 340/432
6,195,020 B1 * 2/2001 Brodeur et al. ............. 340/933
6,208,268 B1 3/2001 Scarzello et al.

(Continued)

FOREIGN PATENT DOCUMENTS

DE 102 16 760 A1 10/2003
EP 1 193 662 A1 7/2001
GB 11 12 166 5/1968
WO WO 96/00958 A 1/1996

OTHER PUBLICATIONS

PCT International Search Report mailed Aug. 20, 2004 (4 pages).

*Primary Examiner*—Benjamin C. Lee
*Assistant Examiner*—Jennifer Mehmood
(74) *Attorney, Agent, or Firm*—Flynn, Thiel, Boutell & Tanis, P.C.

(57) ABSTRACT

A vehicle detection device with a parking gate and a parking stand includes a geomagnetic field sensor in the parking stand for detecting a vehicle at the parking stand and/or a geomagnetic field sensor in the parking gate for detecting a vehicle beneath the opened parking gate.

19 Claims, 3 Drawing Sheets

U.S. PATENT DOCUMENTS

| | | | | |
|---|---|---|---|---|
| 6,486,768 | B1 * | 11/2002 | French et al. | 340/5.92 |
| 6,535,143 | B1 | 3/2003 | Miyamoto et al. | |
| 2002/0170685 | A1 * | 11/2002 | Weik et al. | 160/133 |
| 2003/0110075 | A1 * | 6/2003 | Shioda et al. | 705/13 |
| 2004/0008122 | A1 * | 1/2004 | Michael | 340/686.1 |
| 2004/0155796 | A1 * | 8/2004 | Fukasawa | 340/928 |

* cited by examiner

PARKING CONTROL DEVICE

FIELD OF THE INVENTION

The present invention relates to a device for controlling the authorized access of vehicles to parking facilities having a parking gate.

BACKGROUND OF THE INVENTION

Parking control devices are well known. A ticket is generally used as the storage medium upon which is recorded the authorization to park after payment of the parking fee, or which authorizes long-term parking. After the reading device has read an authorization recorded on the storage medium and a sensor at the parking stand has detected the presence of a vehicle, the parking gate mechanism is activated and the parking gate is opened accordingly. Another sensor is provided at the parking gate to prevent the gate arm from closing when a vehicle is beneath it.

Nowadays, induction loops laid in the pavement are usually used to detect the presence of a vehicle at the parking stand or beneath the parking gate. However, the installation of such induction loops involves a considerable outlay. Induction loops are also susceptible to damage, e.g. from shocks, or, as an example, should moisture penetrate through cracks in the pavement. Moreover, they are sensitive to environmental influences. In this way, temperature fluctuations can lead to a change in inductance and water on the roadway can lead to erroneous detection and opening of the gate arm. Additionally, the adjustment of sensors with induction loops is difficult, if not impossible, for metal-reinforced pavements. Induction loops can also be manipulated by metallic objects that simulate a vehicle.

The use of geomagnetic field sensors for the detection of flowing traffic and for the recognition of authorized access to parking areas, as well as the monitoring of entries and exits, is well known. This involves measuring deviations from the earth's natural geomagnetic field by the use of ferromagnetic bodies. The geomagnetic field sensors can be installed in or alongside the roadway, or overhead (U.S. Pat. No. 5,880,682, EP 1193662 A1).

The purpose of the invention is to configure the well-known parking gates more economically and reliably.

According to the invention, this result is attained by favorable configurations of the device disclosed herein.

SUMMARY OF THE INVENTION

According to the invention, the presence of a vehicle at the parking stand and/or beneath the parking gate is recognized by means of a geomagnetic field sensor. The geomagnetic field sensor is incorporated into the parking stand and/or the parking gate, i.e. it is located at or within the parking stand or parking gate, and therefore internal or external to the barrier support or within or at the barrier bar of the parking gate.

Hence, the geomagnetic field sensor can be installed at the factory. The device according to the invention can therefore be quickly and economically installed on the spot as a ready-to-operate "plug and play" system.

Additionally, the geomagnetic field sensor is insensitive to temperature fluctuations. It is protected from rain and snow by the parking stand housing, or by the barrier support or barrier bar.

Aside from the mere detection of the presence of a vehicle, the vehicle type can also be determined by the geomagnetic sensor based on the form of the measured signals. Moreover, owing to its location within the parking stand, or the barrier support or barrier bar of the gate, the geomagnetic field sensor is not visible from the outside. Manipulation by a metallic object such as a shopping cart, as with an induction loop, is therefore impeded with the device according to the invention.

Owing to the possibility of classifying vehicles based on the form of the signal delivered by the geomagnetic field sensor, different parking rates can be applied to different vehicle types by means of the device according to the invention, for example for motorcycles, private cars, trailers, etc.

A geomagnetic field sensor is preferably located within both the parking stand and the parking gate, whereby the geomagnetic field sensor in the parking gate detects a vehicle beneath the open barrier at the parking gate, which therefore prevents the gate from closing if a vehicle is beneath it.

The geomagnetic field sensor can be located within either the barrier bar or the barrier support of the parking gate. It is protected from rain and snow by the barrier bar or the housing of the barrier support, and is not visible. Additionally, the "plug and play" system can be realized by the geomagnetic field sensor in the parking stand and the geomagnetic field sensor in the parking gate.

A fluxgate magnetic field sensor can be employed as the geomagnetic field sensor, for example. In order not to excessively shield the geomagnetic field sensor—which is integrated into the parking stand, barrier support, or barrier bar—against the earth's geomagnetic field, it is preferable that the housing of the parking stand or the barrier support be made of a non-ferromagnetic material, such as an aluminum alloy or plastic.

The device in the parking stand that controls the mechanism for opening the parking gate can be a reading device for storage media, which opens the barrier upon reading an authorization recorded on a storage medium. As a further example, it can be configured in such a way that it controls the mechanism to open the barrier after the issuance of a car park ticket or a short-term car park ticket at the entrance, for example by means of a photoelectric barrier or the contact of a card in the slot at the parking stand. The reading device can also be used to assure payment at the exit before the barrier opens.

In the case of a roadway with multiple lanes, each with a parking gate, and a geomagnetic field sensor integrated into the parking stand or parking gate, a vehicle in one lane might also be detected by a sensor in the adjacent lane. In order to determine in which lane the vehicle is located, equipment, and preferably wireless equipment, is provided for communication between the geomagnetic field sensors in adjacent lanes. The appropriate lane can then be ascertained, based on a comparison of the intensity and/or the form of the signals from the two sensors, for example.

BRIEF DESCRIPTION OF THE DRAWINGS

Below, by way of example, embodiments of the device according to the invention are described in greater detail with reference to the drawings.

DETAILED DESCRIPTION OF THE INVENTION

Figure 1:
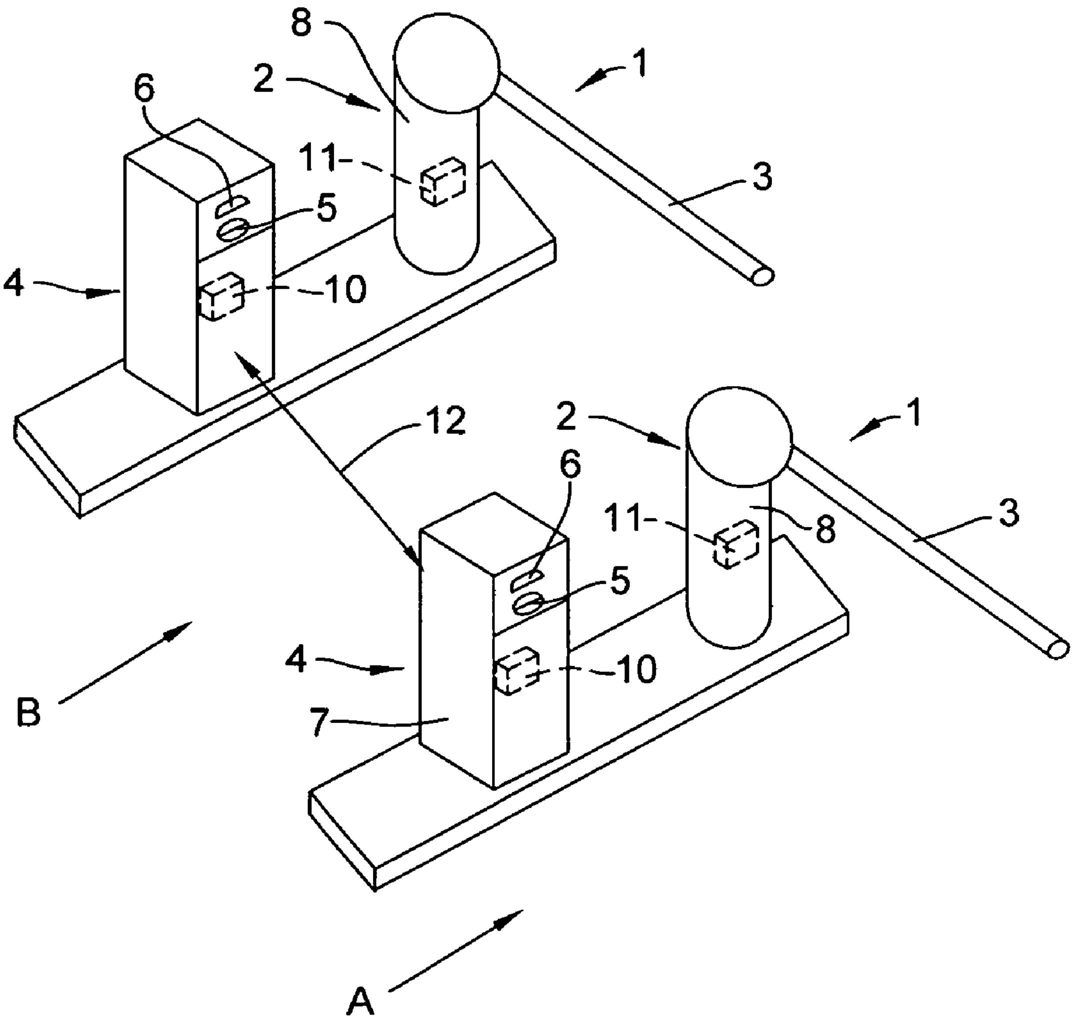
FIG. 1 illustrates a two-lane exit from a parking garage having a parking stand and a corresponding parking gate for each lane.

Parking gates 1, each having a barrier support 2 and a barrier bar 3, as well as a parking stand 4 situated before gate 1 in the direction of travel, are provided next to the two lanes A and B. As shown in FIG. 1, each parking stand 4 has a card slot 5 and a display 6. When exiting the parking garage, a ticket is inserted into the card slot 5, upon which, for example, has been recorded—upon a magnetic stripe or in some other manner—an authorization to leave the parking garage by virtue of payment to a cashier or at an automatic machine.

A geomagnetic field sensor 10 or 11, along with associated electronics and represented by the dashed lines, is located in the housing 7 of the parking stand 4 and in the housing 8 of the barrier support 2, respectively. The housing 7 of the parking stand 4 and the housing 8 of the barrier support 2 consist of a non-ferromagnetic material such as an aluminum alloy.

The geomagnetic field sensor 10 detects the presence of a vehicle at the parking stand 4 in lane A or B, and the geomagnetic field sensor 11 detects the presence of a vehicle beneath the opened barrier bar 3 of the parking gate 1 in the respective lane A or B. A card device 20 for reading tickets inserted into the card slot 5 is provided at each parking stand 4, and a bar actuating control mechanism 22 for actuating the barrier bar 3 is provided in each barrier support 2 as shown in FIG. 2.

When the reading device 20 in the respective parking stand 4 reads a ticket inserted into the card slot 5, upon which is recorded an authorization to exit the parking garage, and the geomagnetic field sensor 10 detects a vehicle, the parking gate 1 is opened by the control mechanism 22 raising the barrier bar 3.

The geomagnetic field sensors 10 in the two parking stands 4 at the lanes A and B are interconnected by communication equipment 12, as represented by the double arrow. By means of known data communication equipment 12, it can be determined whether the vehicle is located in lane A or B, for example by a comparison of the intensity and/or form of the signals from the two sensors 10 located in the parking stands 4 at the two lanes A and B. The equipment 12 is preferably configured for wireless communication.

Figure 2:
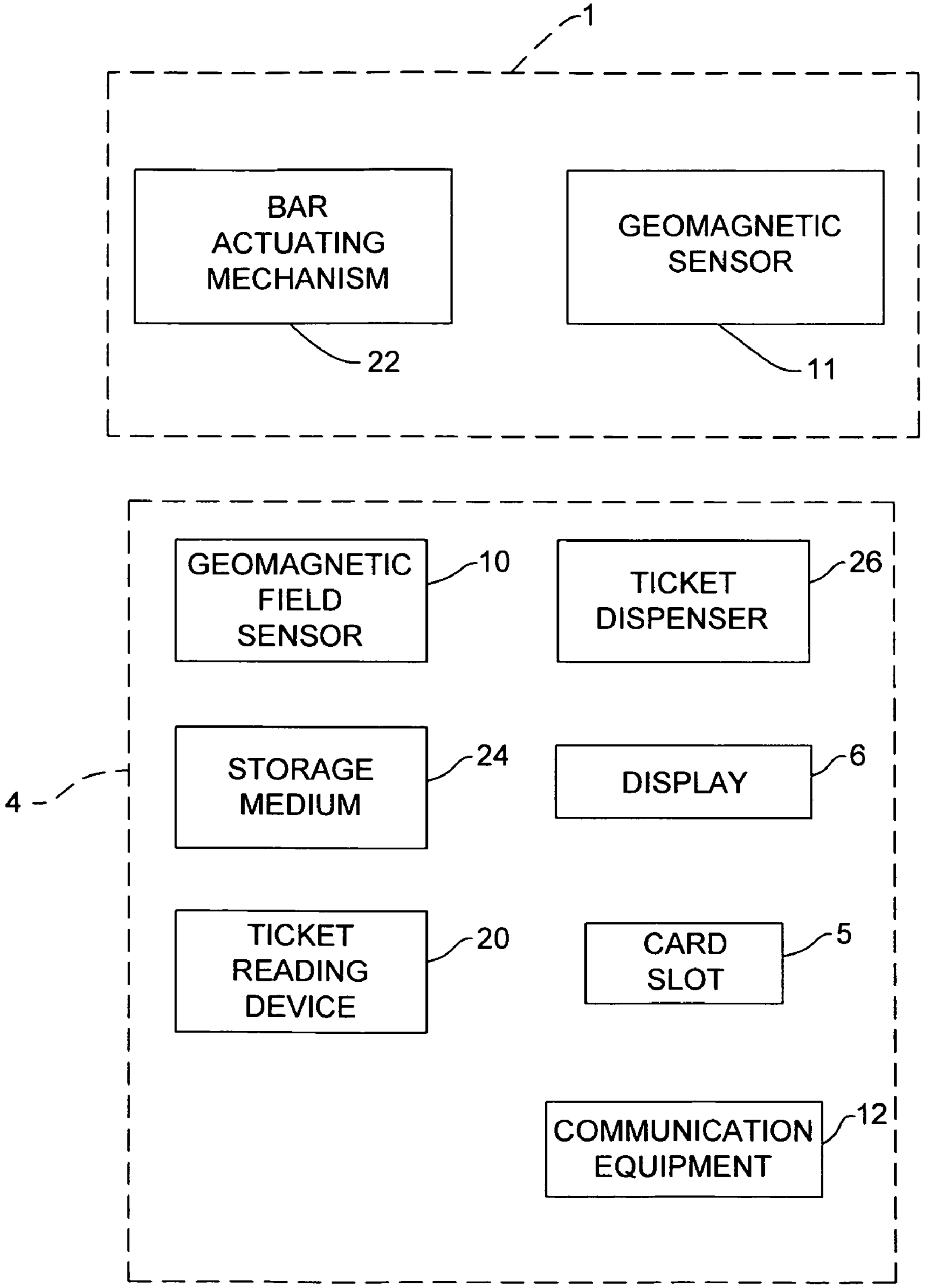
FIG. 2 is a block diagram of the elements of the parking control device.

As shown in FIG. 2, the parking stand 4 includes the reading device 20 for a storage medium 24 and/or a car park ticket dispenser 26, which activates the bar mechanism 22 for opening the parking gate 1.

Figure 3:
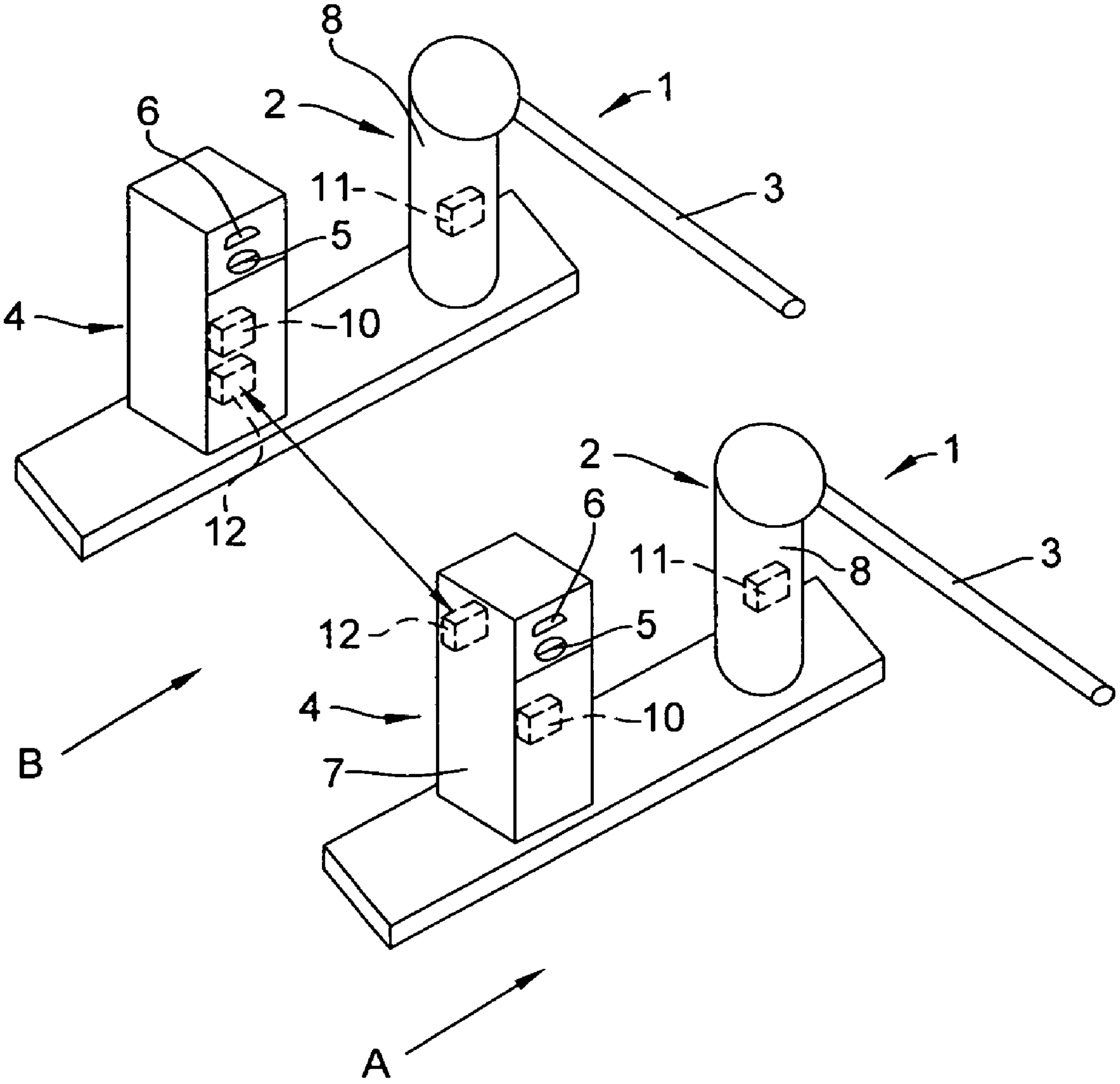
FIG. 3 illustrates a two-lane exit from a parking garage having equipment in the adjacent parking stands.

In the embodiment shown in FIG. 3, the equipment 12 provided in each parking stand 4 enables reciprocal communication to compare the intensity and/or form of signals from the geomagnetic field sensors 10 in the adjacent lanes to determine which lane A, B a vehicle is located in.

The invention claimed is:

1. A vehicle detection device for a multi-lane roadway with a first parking gate at a first lane and a first parking stand located before the first parking gate in the direction of travel, including a first geomagnetic field sensor for detecting the presence of a vehicle at the first parking stand, and a reading device for at least one of a storage medium and a car park ticket dispenser, which activates a first mechanism for opening the first parking gate when one of an authorization recorded on the storage medium is read, or after the issuance of a car park ticket a second parking gate at a second lane adjacent the first lane for vehicles traveling in the same direction as vehicles traveling in the first lane, a second parking stand disposed before the second parking gate, including a second geomagnetic sensor for detecting the presence of a vehicle at the second parking stand, and equipment for providing reciprocal communication between the first and second parking stands, and for comparing at least one of signal intensity and signal form of signals from the first and second geomagnetic field sensors to determine the lane in which a sensed vehicle is located.

2. A device according to claim 1, including third and fourth geomagnetic field sensors incorporated within respective barrier supports of the first and second parking gates to prevent the parking gates from contacting a vehicle.

3. A device according to claim 1, including geomagnetic field sensors incorporated within respective barrier bars of the first and second parking gates to prevent the bars from contacting a vehicle.

4. A device according to claim 3, wherein each said parking stand and each said parking gate comprises a non-ferromagnetic material in the vicinity of the respective said geomagnetic field sensor.

5. A device according to claim 1, wherein the first and second geomagnetic field sensors are located within the respective first and second parking stands.

6. A parking control device according to claim 1, wherein the equipment for reciprocal communication provides wireless reciprocal communication between the parking stands, the parking stands being separate from each other by a roadway lane therebetween.

7. A parking control device comprising:

at least one parking gate disposed on a roadway having at least one lane, said parking gate having a mechanism for opening and closing the parking gate;

a parking stand located before the parking gate along a predetermined direction of vehicle travel;

a first geomagnetic field sensor disposed in the parking stand for detecting the presence of a vehicle at said parking stand;

a second geomagnetic field sensor disposed in the parking gate for detecting a vehicle beneath the opened parking gate to prevent a barrier bar of the parking gate from contacting a vehicle; and a reading device for at least one of a storage medium and a car park ticket dispenser, which activates the mechanism for opening the parking gate when an authorization recorded on the storage medium is read, or after the issuance of a car park ticket.

8. A parking control device according to claim 7, wherein the second geomagnetic field sensor incorporated within the parking gate is disposed within a barrier support of the parking gate.

9. A parking control device according to claim 7, wherein the second geomagnetic field sensor incorporated within the parking gate is disposed within the barrier bar of the parking gate.

10. A parking control device according to claim 7, wherein the parking gate and the parking stand each comprise a non-ferromagnetic material in the vicinity of the respective said geomagnetic field sensor.

11. A parking control device according to claim 7, for a multi-lane roadway, wherein said parking stand comprises a first parking stand, said device including a second parking stand disposed on a roadway at a second lane adjacent the first lane and having a second geomagnetic sensor, wherein the parking stands are separated by one of the lanes; and equipment for reciprocal communication between the parking stands to compare at least one of signal form and signal intensity of signals from the geomagnetic field sensors to determine the lane in which a sensed vehicle is located.

12. A parking control device according to claim 11, wherein the equipment for reciprocal communication provides wireless reciprocal communication between the parking stands, the parking stands being separate from each other by a roadway lane therebetween.

13. A parking control device for a multi-lane roadway, said parking control device comprising:

first and second parking gates disposed on the roadway to provide access to first and second adjacent lanes, each said parking gate having a mechanism for opening and closing the parking gate;

first and second parking stands, wherein said first parking stand is located before the first parking gate in the direction of travel, and said second parking stand is located before the second parking gate in the direction of travel, said parking stands separated from each other by one of the lanes;

a first geomagnetic field sensor disposed in the first parking stand for providing a first signal;

a second said geomagnetic field sensor disposed in the second parking stand for providing a second signal;

equipment for reciprocal communication between the first parking stand and the second parking stand to determine from the first and second signals of the first geomagnetic sensor and the second geomagnetic field sensor, in which lane a sensed vehicle is located;

a first reading device associated with the first parking gate and the first parking stand; and a second reading device associated with the second parking gate and the second parking stand, wherein each said reading device, in response to a condition, activates the respective mechanism for opening the respective first or second parking gate.

14. A parking control device according to claim 13, including first and second field geomagnetic gate sensors incorporated within the respective first and second parking gates to prevent barrier arms from contacting a vehicle passing therethrough.

15. A parking control device according to claim 13, wherein the first and second reading devices each comprise a car park ticket dispenser disposed in the first parking stand and the second parking stand respectively, and the condition comprises issuance of a car park ticket.

16. A parking control device according to claim 13, wherein the first and second said parking gates and the first and second said parking stands each comprise a non-ferromagnetic material in the vicinity of the respective said geomagnetic field sensor.

17. A parking control device according to claim 13, wherein the control device classifies a vehicle based on the form of the signals delivered by the respective geomagnetic field sensors.

18. A parking control device according to claim 13, wherein the geomagnetic field sensors are replaceable sensors and thus function as a plug and play system.

19. A parking control device according to claim 13, wherein the equipment for reciprocal communication provides wireless reciprocal communication between the parking stands.

* * * * *